Oct. 28, 1930.  J. BACKSTATTER  1,779,795
ABNORMAL STEAM PRESSURE SIGNAL
Filed Nov. 14, 1929
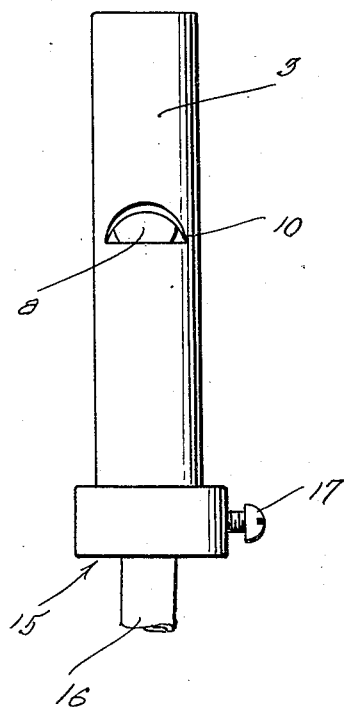
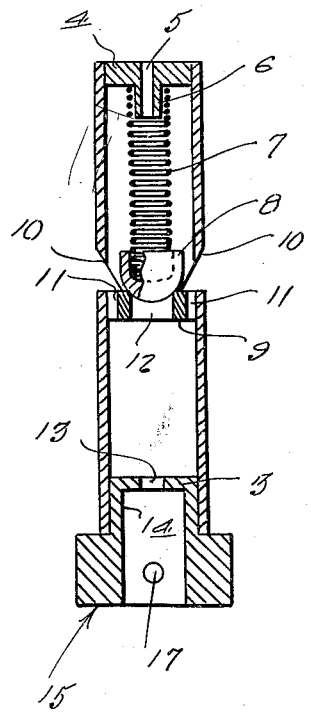
Inventor
Joseph Backstatter
By Clarence A. O'Brien
Attorney Patented Oct. 28, 1930

1,779,795

UNITED STATES PATENT OFFICE

JOSEPH BACKSTATTER, OF WINFIELD, NEW YORK

ABNORMAL-STEAM-PRESSURE SIGNAL

Application filed November 14, 1929. Serial No. 407,228.

This invention relates to an improved pressure signal which is especially designed for automotive use and consists of an appliance in the nature of a whistle which is adapted to be attached to the overflow pipe in the radiator circulating system in a manner to give an audible warning when the heat pressure in the radiator is excessive.

The gist of the invention is the provision of a simple and economical appliance of this class which is constructed to give a shrill whistle signal and which is made safe by the incorporation therein of an excessive pressure blow off valve.

In the drawings:

Figure 1 is an elevational view of a whistle constructed in accordance with the present invention, Figure 2 is a vertical sectional view through the same, In the drawings the body of the signal is indicated at 3 in the nature of an open ended tube. Fitted in one end of this tube is a plug disk 4 having a vent 5 and an inwardly projecting nipple 6 which constitutes a retainer for a coiled spring 7. This spring is nested in the socket of a substantially semispherical blow-off or check valve 8. This engages a seat ring 9 mounted in the central portion of the cylinders adjacent the diametrically opposite whistle producing orifices or openings 10.

This ring defines escape ports 11 and a central valved port 12 which functions when the pressure is excessive. The pressure enters through the intake port 13 formed in the socket portion 14 of the attaching collar 15. This attaching collar is adapted to receive the end of the steam pipe 16 and is held in place by means of a set screw 17.

In practice the whistle is attached to the end of the overflow or steam pipe 16 as represented in the drawing. When the pressure becomes excessive, it produces whistle signals by means of the openings or slots 10 in an obvious manner. If the pressure becomes unusually excessive, it acts on the spring pressed check valve 8 which opens and relieves the pressure in a more expeditious manner.

It will be observed that the spring surrounding the nipple 6 affords means for venting the whistle in an appropriate manner.

From the foregoing description and drawings it will be observed that I have evolved and produced a simple and economical whistle such as may be attached to the conventional steam pipe in a way to afford a clear and shrill signal whistle.

I claim:

1. As a new product of manufacture, a whistle including a body having pressure discharge orifices and means for attaching it to a conventional overflow pipe in a water circulating system of an automobile, and an excess pressure blow off valve in said body.

2. In a signal whistle of the class described, an open ended cylinder provided intermediate its ends with diametrically opposite pressure discharge ports and provided between its end and on its interior at a point near said ports with an annular valve seat, a vent device at one end of the body, and an attaching device at the opposite end, together with a spring pressed valve in said body cooperable with said seat.

3. In a signal whistle of the class described, an open ended tubular body, a fitting in one end of the body including a collar and a set screw, said body being provided intermediate its ends with pressure discharge ports, an annular valve seat on the interior of the body adjacent said ports, a plug fitted in the opposite end of said body and formed with a vent aperture, and a valve cooperable with said seat.

4. As a new product of manufacture, a whistle of the class described comprising an open ended cylinder, a socketed collar, the socket thereof being fitted telescopically in one end of the cylinder and formed with an intake port, said cylinder being provided between its ends with pressure discharge ports, a valve seat ring in the cylinder adjacent said ports, a disk like plug at the opposite end of the cylinder including a vent hole and an inwardly projecting nipple communicating therewith, a coil spring in the cylinder surrounding the nipple at one end, a valve having a socket in which the other end of said spring is located, said valve being engageable with said seat ring.

In testimony whereof I affix my signature.

JOSEPH BACKSTATTER.